United States Patent
Gan et al.

(10) Patent No.: US 11,248,444 B2
(45) Date of Patent: Feb. 15, 2022

(54) TOOL FOR OPENING SLIDING SLEEVE

(71) Applicants: China Petroleum & Chemical Corporation, Beijing (CN); Sinopec Southwest Oil & Gas Company, Chengdu (CN)

(72) Inventors: Zhenwei Gan, Chengdu (CN); Bin Qi, Chengdu (CN); Zhimin Hou, Chengdu (CN); Shunqu Hu, Chengdu (CN); Wei Zhao, Chengdu (CN); Zhi Xie, Chengdu (CN); Qiang Wang, Chengdu (CN); Tao Liu, Chengdu (CN); Jian Pan, Chengdu (CN); Wenfeng Pang, Chengdu (CN)

(73) Assignees: CHINA PETROLEUM & CHEMICAL CORPORATION, Beijing (CN); SINOPEC SOUTHWEST OIL & GAS COMPANY, Chengdu (CN)

( * ) Notice: Subject to any disclaimer, the term of this patent is extended or adjusted under 35 U.S.C. 154(b) by 670 days.

(21) Appl. No.: 16/071,154

(22) PCT Filed: Jan. 13, 2017

(86) PCT No.: PCT/CN2017/071164
§ 371 (c)(1),
(2) Date: Jul. 19, 2018

(87) PCT Pub. No.: WO2017/124977
PCT Pub. Date: Jul. 27, 2017

(65) Prior Publication Data
US 2021/0172287 A1    Jun. 10, 2021

(30) Foreign Application Priority Data

Jan. 20, 2016 (CN) .......................... 201610036826.2
Jan. 20, 2016 (CN) .......................... 201610037242.7
(Continued)

(51) Int. Cl.
*E21B 34/14* (2006.01)
*E21B 37/10* (2006.01)
*F16C 29/06* (2006.01)

(52) U.S. Cl.
CPC .............. *E21B 34/14* (2013.01); *E21B 37/10* (2013.01); *F16C 29/0688* (2013.01); *F16C 2352/00* (2013.01)

(58) Field of Classification Search
CPC ......... E21B 34/14; E21B 34/142; E21B 37/10
See application file for complete search history.

(56) References Cited

U.S. PATENT DOCUMENTS 2,390,372 A * 12/1945 Johnston ............... E21B 33/128
                                                                277/341
2,994,280 A *  8/1961 Daffin ..................... E21B 34/14
                                                                166/133
(Continued)

FOREIGN PATENT DOCUMENTS

CN        102966332 A       3/2013
CN        203050626 U       7/2013
(Continued)

OTHER PUBLICATIONS

International Search Report for International Application No. PCT/CN2017/071164, dated Apr. 12, 2017.

*Primary Examiner* — Cathleen R Hutchins
(74) *Attorney, Agent, or Firm* — Finnegan Henderson Farabow Garrett & Dunner LLP

(57) ABSTRACT

A sliding sleeve opening tool includes an engaging element, a ball seat and a guiding head connected in sequence, as disclosed herein. The engaging element includes at least two elastic pawls uniformly disposed in a circumferential direction and at least one engaging part disposed on an external circumferential surface of an elastic pawl, and the engaging element is further provided with a first fluid channel which
(Continued)

runs through the engaging element. The ball seat is provided with a second fluid channel which runs through the ball seat, and within the second fluid channel a taper hole section for bearing a sealing ball is disposed, the second fluid channel being in communication with the first fluid channel. The guiding head is provided with a third fluid channel which runs through the guiding head, and the third fluid channel is in communication with the second fluid channel. The sliding sleeve opening tool has at least one of the pushing function, the fishing function, the pushing assistance function, the mud scraping function and the sealing function.

14 Claims, 7 Drawing Sheets

(30) Foreign Application Priority Data

Jan. 20, 2016 (CN) .......................... 201610037576.4
Jan. 20, 2016 (CN) .......................... 201620056708.3

(56) References Cited

U.S. PATENT DOCUMENTS

| 4,360,063 | A | * | 11/1982 | Kilgore | ................ E21B 23/08 |
| | | | | | 166/313 |
| 4,718,488 | A | * | 1/1988 | Pringle | ................ E21B 23/02 |
| | | | | | 166/135 |
| 2006/0060352 | A1 | | 3/2006 | Vidrine et al. | |
| 2013/0014953 | A1 | | 1/2013 | van Petegem | |
| 2013/0161015 | A1 | * | 6/2013 | Campbell | ............ E21B 43/26 |
| | | | | | 166/308.1 |

FOREIGN PATENT DOCUMENTS

| CN | 103321608 A | 9/2013 | | |
| CN | 203603869 U | 5/2014 | | |
| CN | 105672944 A | 6/2016 | | |
| CN | 105672945 A | 6/2016 | | |
| CN | 105696976 A | 6/2016 | | |
| CN | 205503095 U | 8/2016 | | |
| GB | 2491140 | * | 11/2012 | ............ E21B 34/14 |

* cited by examiner

TOOL FOR OPENING SLIDING SLEEVE

CROSS-REFERENCE TO RELATED APPLICATIONS

This application claims priorities of the following applications: Chinese patent application CN201610036826.2, entitled "Sliding sleeve opening device" and filed on Jan. 20, 2016; Chinese patent application CN201610037242.7, entitled "Movable-sealing sliding sleeve opening tool" and filed on Jan. 20, 2016; Chinese patent application CN201620056708.3, entitled "Sliding sleeve opening tool having pushing function" and filed on Jan. 20, 2016; and Chinese patent application CN201610037576.4, entitled "Sliding sleeve opening device" and filed on Jan. 20, 2016. The entirety of the above applications is incorporated herein by reference.

FIELD OF THE INVENTION

The present disclosure relates to the technical field of oil and gas well completion and reservoir stimulation, and in particular, to a sliding sleeve opening tool.

BACKGROUND OF THE INVENTION

With the development of oil and gas reservoirs towards tight reservoirs with low permeability, relevant traditional tool technologies can no longer meet requirements.

A sliding sleeve is one of key tools for communicating with annulus between tubing and casing and achieving staged fracture during a fracturing process. During a gas production test process of oil and gas well completion, the annulus between tubing and casing is communicated by an opening action of the sliding sleeve so as to achieve operations such as circulation, fluid replacement, sand fracturing. Only one sliding sleeve is needed in one-stage stimulation. However, a plurality of sliding sleeves need to be connected in sequence on one tubing string during multi-stage stimulation. During the multi-stage stimulation, a stage is fractured after a corresponding stage of sliding sleeve is opened, and multiple stages are fractured from bottom to top. With exploration and development of tight gas reservoir, a horizontal segment of a horizontal well becomes increasingly longer, and stages for sand fracturing become more and more. Technologies of ten stages of, twenty stages of or even tens of stages of sliding sleeves are needed.

For a traditional sliding sleeve, a ball is used as a mechanism for holding pressure. One ball corresponds to one ball seat, and a diameter of a ball is larger than a diameter of a ball receiving seat. When a multi-stage sliding sleeve is used for operations, different balls and ball receiving seats are disposed in an order that dimensions thereof increase according to a certain grade difference stage by stage. During stimulation, balls are dropped in in an order from small ones to large ones so as to open corresponding sliding sleeves. In order to overcome deficiencies existing in technologies of traditional sliding sleeves, new sliding sleeve technologies that more stages can be achieved theoretically has been proposed successively at home and abroad. For example, a composite sliding sleeve, which has special matching opening tools, is designed, and the composite sliding sleeve can be opened by automatic and one-to-one engagement between the opening tools and the sliding sleeve.

However, at present, after the composite sliding sleeve is opened by using the opening tools and the fracture stimulation is completed, the opening tools can only be taken out of a wellbore one by one, efficiency of which is low. Moreover, the opening tools do not have a pushing function, a pushing assistance function, a cleaning function and a sealing function, and an effect obtained by using the opening tools is not satisfactory.

SUMMARY OF THE INVENTION

The main objective of the present disclosure is to provide a sliding sleeve opening tool, which can overcome deficiencies in the prior art and has at least one of the pushing function, the fishing function, the pushing assistance function, the mud scraping function and the sealing function.

In order to achieve the above purpose, the present disclosure provides a sliding sleeve opening tool, which comprises an engaging element, a ball seat and a guiding head connected in sequence.

The engaging element comprises at least two elastic pawls uniformly disposed in a circumferential direction and at least one engaging part disposed on an external circumferential surface of an elastic pawl, and the engaging element is further provided with a first fluid channel which runs through the engaging element.

The ball seat is provided with a second fluid channel which runs through the ball seat, and within the second fluid channel a taper hole section for bearing a sealing ball is disposed, the second fluid channel being in communication with the first fluid channel.

The guiding head is provided with a third fluid channel which runs through the guiding head, and the third fluid channel is in communication with the second fluid channel.

According to the sliding sleeve opening tool, a guiding inclined surface is disposed on an external circumferential surface of an end of the engaging element far from the ball seat.

According to the sliding sleeve opening tool, a protrusion or a groove is disposed on the external circumferential surface of the elastic pawl.

According to the sliding sleeve opening tool, a guiding inclined surface is disposed on an external circumferential surface of an end of the guiding head far from the ball seat.

According to the sliding sleeve opening tool, the third fluid channel comprises a taper hole section disposed at an end of the guiding end, and a large-opening end of the taper hole section is far from the ball seat.

According to the sliding sleeve opening tool, an inner diameter of the large-opening end of the taper hole section is smaller than an outer diameter of the guiding head, and an end surface is formed between an external circumferential surface of the guiding head and a hole wall of the taper hole section. A longitudinal section of the end surface along an axial direction of the taper hole section is in a circular arc shape.

According to the sliding sleeve opening tool, an annular groove which extends circumferentially along the third fluid channel is disposed on an inner wall of the third fluid channel.

According to the sliding sleeve opening tool, a retaining part is disposed on an inner wall of the first fluid channel close to the seat ball. The second fluid channel further comprises a middle hole section which is in communication with the taper hole section, and the middle hole section is provided with a bearing surface. The retaining part and the bearing surface together with the second fluid channel form a ball cage, and the sealing ball is disposed in the ball cage.

According to the sliding sleeve opening tool, the ball seat has a connection end part which is connected to the engaging element, and an annular elastic element is disposed on the connection end part.

According to the sliding sleeve opening tool, a press ring which abuts against the annular ring is further included.

According to the sliding sleeve opening tool, a cleaning element is disposed on a lower end of the connection end part. According to the sliding sleeve opening tool, the engaging element comprises a tube body, a lower end of which is provided with a plurality of lower pawl parts disposed circumferentially with a distance therebetween, and a connector which is connected to a free end of a lower pawl part.

According to the sliding sleeve opening tool, the engaging element is connected to a sliding sleeve in a wellbore, and is provided with a rubber barrel which can be attached to the sliding sleeve in a wellbore after expanding due to extrusion. An 30 extrusion element is disposed on an outer wall of the ball seat. The extrusion element can be movably disposed on the engaging element, and is used for extruding the rubber barrel.

According to the sliding sleeve opening tool, the extrusion element comprises a ring sleeve which is movably disposed on an inner side of the engaging element and an extrusion sleeve which is sleeved on an outer side of the engaging element. The ring sleeve extends through a plurality of lower pawl parts of the engaging element, and is connected to the extrusion sleeve. The rubber barrel is sleeved on a connector which is connected to a free end of a lower pawl part of the engaging element and abuts against a lower end of the extrusion sleeve.

According to the sliding sleeve opening tool, the ring sleeve is connected to the engaging element via a shear pin.

According to the sliding sleeve opening tool, a guiding groove for accommodating the engaging element is disposed between an outer wall of the ring sleeve and an inner wall of the extrusion sleeve.

According to the sliding sleeve opening tool, a space is formed by a lower end surface of the ring sleeve, an inner side of a lower pawl part of the engaging element, and an end surface of an end of the connector having a thread.

The present disclosure has following beneficial effects.

1. The sliding sleeve opening tool has a pushing function. A pushing tool can push a sliding sleeve opening tool in an uppermost stage close to a well head towards a well bottom. The sliding sleeve opening tool in the uppermost stage can engage with an engaging element of a sliding sleeve opening tool in an adjacent stage so as to push the sliding sleeve opening tool in the adjacent stage towards the well bottom. Same engagement is performed between two adjacent sliding sleeve opening tools, and finally all sliding sleeve opening tools in the wellbore can be pushed to the well bottom. In this way, full bore of the tubing string for fracturing can be achieved, and stimulation efficiency can be improved.

2. The sliding sleeve opening tool has a fishing function. When at least two sliding sleeve opening tools are put into the wellbore, two adjacent sliding sleeve opening tools can be connected to each other in sequence to form an entirety. In this way, all sliding sleeve opening tools can be connected in sequence and form an entirety. In this way, sliding sleeve opening tools which form an entirety by sequential connections can be fished out of the wellbore at one time, and efficiency of a fishing operation can be improved.

3. The sliding sleeve opening tool has a pushing assistance function. The annular elastic element and the press ring form a pushing assistance structure, and the annular elastic element can fill a gap between an external surface of the connection end part of the sliding sleeve opening tool and an inner wall of a sliding sleeve. In this way, a fluid flow at this position can be reduced, which is beneficial for pushing the sliding sleeve opening tool to axially move along the wellbore by an external pumping pressure.

4. The sliding sleeve opening tool has a mud scraping function. A pipe wall of the sliding sleeve in the wellbore can be cleaned by the cleaning element.

5. The sliding sleeve opening tool has a sealing function. After being extruded, the rubber barrel can be attached to the sliding sleeve in the wellbore. In this way, sealing between the sliding sleeve opening tool and the sliding sleeve in the wellbore can be achieved, and further a possibility that an operating fluid leaks into a well stage lower than the sliding sleeve opening tool is reduced. Moreover, the sliding sleeve opening tool has a simple structure. It is easy to produce and install the sliding sleeve opening tool, and cost thereof is low.

BRIEF DESCRIPTION OF THE DRAWINGS

The present disclosure will be explained in detail based on the embodiments and with reference to the accompanying drawings. In the drawings:

FIG. 5b schematically shows an A-A cross-section view of FIG. 5a;

FIG. 6b schematically shows a B-B cross-section view of FIG. 6a;

FIG. 7b schematically shows a C-C cross-section view of FIG. 7a.

Figure 1:
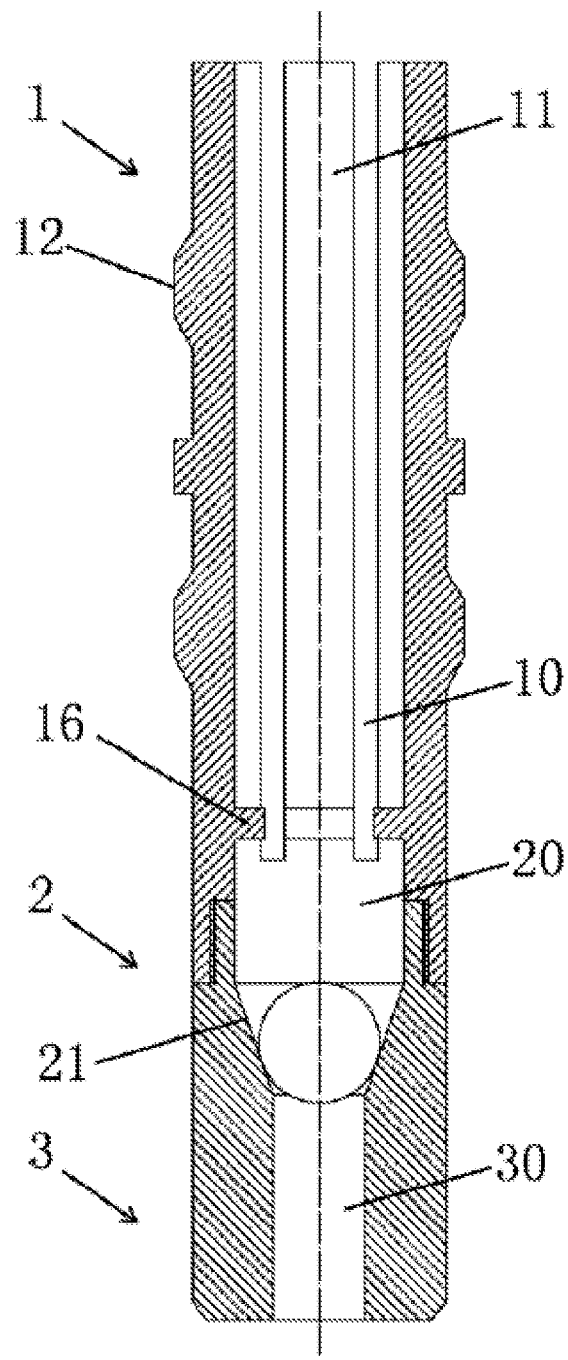
FIG. 1 schematically shows an overall structure of a sliding sleeve opening tool according to the present disclosure.

In the drawings, same components are represented by same reference signs, and a size of a component does not represent an actual size of the corresponding component.

DETAILED DESCRIPTION OF THE EMBODIMENTS

The present disclosure will be further explained in detail with reference to the accompanying drawings.

FIG. 1 schematically shows an overall structure of a sliding sleeve opening tool according to the present disclosure. The present disclosure provides a sliding sleeve opening tool. The sliding sleeve comprises an engaging element 1, a ball seat 2 and a guiding head 3 connected in sequence. The engaging element 1 comprises at least two elastic pawls 11 uniformly disposed in circumferential direction and at least one engaging part 12 disposed on an external circumferential surface of an elastic pawl. The engaging element 1 further comprises a first fluid channel 10 which runs through the engaging element 1. The ball seat 2 comprises a second fluid channel 20 which runs through the ball seat 2, and a bearing surface 21 for bearing a sealing ball is disposed within the second fluid channel 20. The second fluid channel 20 is in communication with the first fluid channel 10. The guiding head 3 comprises a third fluid channel 30 which runs through the guiding head 3, and the third fluid channel 30 is in communication with the second fluid channel 20.

Preferably, the engaging element 1 comprises four elastic pawls 11, and the engaging part 12 comprises at least one protrusion. When a plurality of protrusions are disposed on a circumferential surface of an elastic pawl 11, the plurality of protrusions are disposed along an extending direction of the elastic pawl with a distance therebetween. A groove for engaging with a protrusion is disposed on an inner wall of a sliding sleeve (not shown in FIG. 1). Two protrusions disposed on at least one end are both provided with a guiding surface close to a top of the elastic pawl 11 and a guiding surface close to a bottom of the elastic pawl 11. The groove on the sliding sleeve has an inclined surface for engaging with the guiding surface. A protrusion provided with a guiding surface can smoothly get in and out of the groove disposed on the sliding sleeve.

When the sliding sleeve opening tool is lowered into the wellbore, the elastic pawl 11 radially shrinks due to a radial force applied by a well wall, so that the sliding sleeve opening tool can be lowered smoothly. When the sliding sleeve opening tool is lowered to a position of a matching target sliding sleeve, the radial force applied to the elastic pawl 11 disappears, and thus the elastic pawl 11 can expand to an initial state. Further, a protrusion on the elastic pawl 11 can be engaged in the groove on the sliding sleeve. At this time, the sliding sleeve opening tool is ready for opening the sliding sleeve. When the sliding sleeve opening tool needs to be fished, a radial force is applied to the elastic pawl 11 to make the elastic pawl 11 radially shrink and deform, and further the protrusion disposed on the elastic pawl 11 is separated from the groove on the sliding sleeve and finally gets out of an engagement with the sliding sleeve. At this time, the sliding sleeve opening tool can be fished.

Figure 2A:
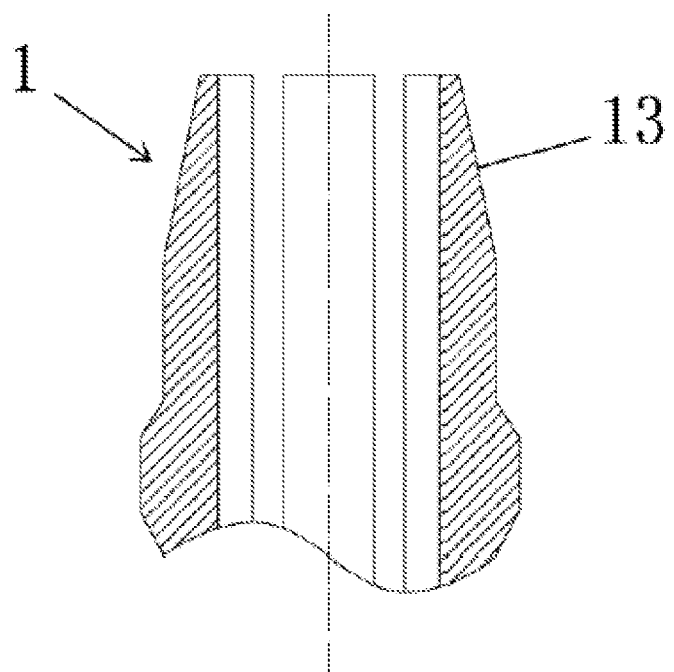
FIG. 2a schematically shows a structure of an engaging element having a pushing function.

FIG. 2a schematically shows a structure of an engaging element having a pushing function. Preferably, a guiding inclined surface 13 is disposed on an external circumferential surface of an end of the engaging element 1 far from the seat ball 2. That is, the guiding inclined surface 13 is disposed on an external circumferential surface of a free end of the elastic pawl 11. In this way, an inclined surface facing an external environment is formed on the free end of the elastic pawl 11, and the inclined surface can serve to guide and engage. When a sliding sleeve opening tool in an upper stage is pushed to perform a fishing operation, an acting surface disposed on a guiding head 3 thereof can engage with a guiding inclined surface 13 on a free end of an elastic pawl 11 of a sliding sleeve opening tool in a lower stage. Multiple structure deformations of the guiding head 3 will be described in detail hereinafter.

Figure 2B:
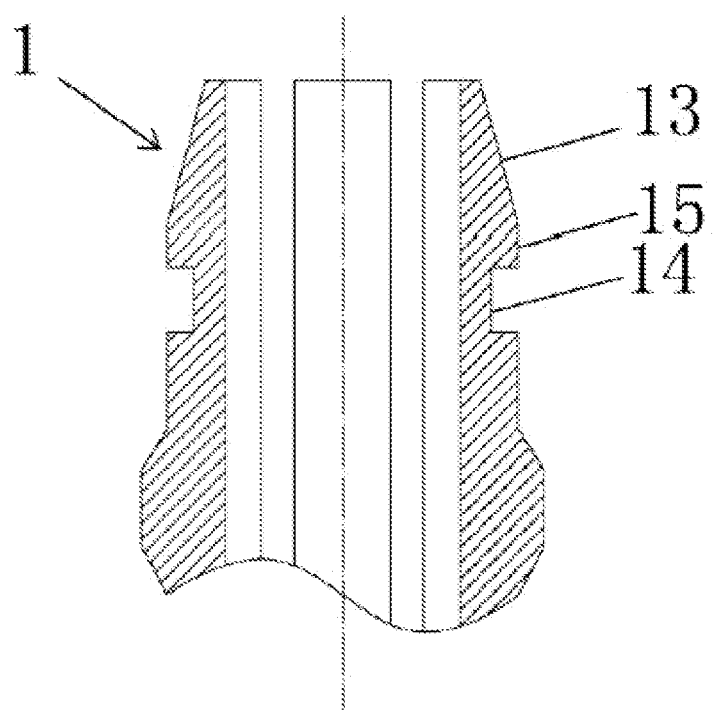
FIG. 2b schematically shows a structure of an engaging element having a fishing function.

FIG. 2b schematically shows a structure of an engaging element having a fishing function. Preferably, a protrusion or a groove is further disposed on an external circumferential surface of the elastic pawl 11. In FIG. 2b, a groove 14 is shown. When a fishing operation is performed, a locking tooth of a sliding sleeve opening tool in an upper stage can be engaged in a groove of a sliding sleeve opening tool in a lower stage to realize an engagement connection therebetween. Therefore, an engagement connection between the sliding sleeve opening tool in the upper stage and the sliding sleeve opening tool in the lower stage has stability and reliability in a fishing process.

Figure 3A:
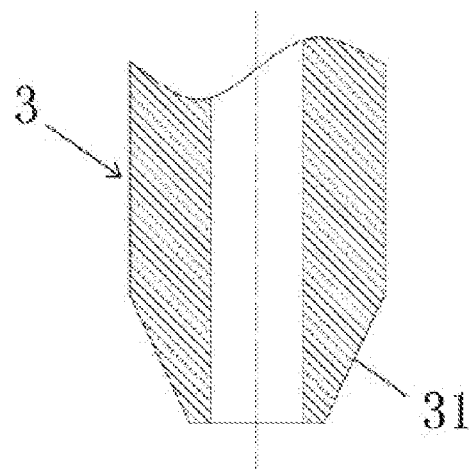
FIG. 3a schematically shows a structure of a guiding head.

FIG. 3a schematically shows a structure of a guiding head. A guiding inclined surface 31 is disposed on an external circumferential surface of an end of the guiding head 3 far from the ball seat 2. The guiding inclined surface 31 can effectively guide the sliding sleeve opening tool to move downwards so as to reduce resistance for lowering the sliding sleeve opening tool.

Figure 3B:
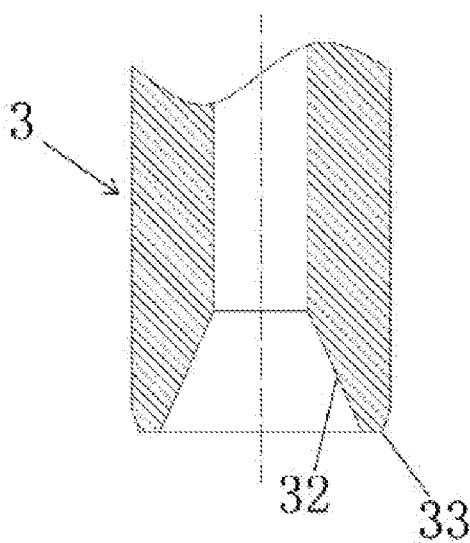
FIG. 3b schematically shows a structure of a guiding head having a pushing head.

FIG. 3b schematically shows a structure of a guiding head having a pushing head. The third fluid channel 30 comprises a pushing end 32 which is a taper hole section and is disposed at an end of the guiding head 3, and a large-opening end of the pushing end 32 is far from the ball seat 2. The pushing end 32 can guide an elastic pawl 11 of a sliding sleeve opening tool in a lower stage to go into the pushing end 32 so as to make the elastic pawl 11 to get out of engagement with a sliding sleeve. In this way, the pushing end 32 can push the sliding sleeve opening tool in the lower stage to move towards a well bottom.

Preferably, an inner diameter of the large-opening end of the pushing end 32 is smaller than an outer diameter of the guiding head 3. An end surface 33 is formed between an external circumferential surface of the guiding head 3 and a hole wall of the pushing end 32, and a longitudinal section of the end surface 33 along an axial direction of the pushing end 32 is in a circular arc shape. That is, a rounded-corner structure is disposed between an end surface 33 of the pushing end 32 and an external circumferential surface of the pushing end 32 and between the end surface 33 of the pushing end 32 and the hole wall of the pushing end 32. An end surface of the pushing end 32 in a circular arc shape can go into a gap between a guiding inclined surface 13 of an elastic pawl 11 of a sliding sleeve opening tool and an inner wall of a sliding sleeve more easily, which makes the elastic pawl 11 get out of an engagement with the sliding sleeve, so that a pushing operation can be completed smoothly.

Figure 3C:
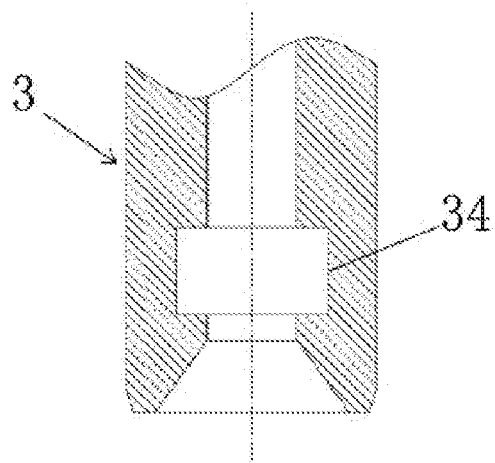
FIG. 3c schematically shows a structure of a guiding head having a fishing head.

FIG. 3c schematically shows a structure of a guiding head having a fishing head. An annular groove 34, which extends along a circumferential direction of the third fluid channel 30, is disposed on an inner wall of the third fluid channel 30. When an end of an elastic pawl 11 of a sliding sleeve opening tool in a lower stage goes into the third fluid channel 30 and a position of an engaging structure 15 (as shown in FIG. 2b) thereof matches a position of the annular groove 34, the end of the elastic pawl 11 will expand radially under an action of an elastic restoring force. Further, the engaging structure 15 will be engaged in the annular groove 34, so that an engagement connection is formed between a sliding sleeve opening tool in an upper stage and the sliding sleeve opening tool in the lower stage which ensures stability and reliability of an engagement between the sliding sleeve opening tool in the upper stage and the sliding sleeve opening tool in the lower stage during a fishing operation process.

Figure 4A:
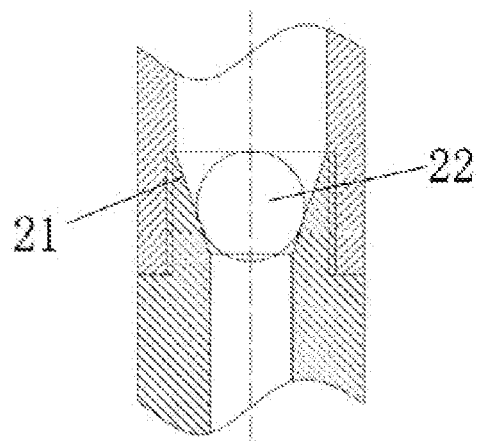
FIG. 4a schematically shows a structure of a ball seat.

FIG. 4a schematically shows a structure of a ball seat. A retaining part 16 (as shown in FIG. 1) is disposed on an inner wall of the first fluid channel 10 close to the ball seat 2, and a bearing surface 21 for bearing a sealing ball 22 is disposed within the second fluid channel 20. The retaining part 16 and the bearing surface 21 together with the second fluid channel 20 form a ball cage, and the sealing ball 22 is disposed in the ball cage. In this way, the sealing ball 22 can be lowered into the wellbore with a sliding sleeve opening tool, and there is no need to drop a ball at a well head. When the sealing ball 22 moves freely in the ball cage, it is limited by the retaining part 16, so that the sealing ball 22 cannot get out of the ball cage. When the sliding sleeve opening tool is lowered to a predetermined position, an external pumping pressure can be applied directly to the sliding sleeve opening tool, which can shorten stimulation time. After the external pumping pressure is applied, the sealing ball 22 abuts against the bearing surface 21 so as to form a sealing surface, and thus a sliding sleeve opening operation is completed.

Figure 4B:
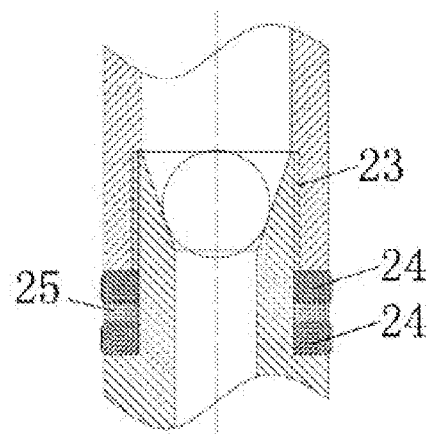
FIG. 4b schematically shows a structure of a ball seat having a pushing assistance function.

FIG. 4b schematically shows a structure of a ball seat having a pushing assistance function. Preferably, the ball seat 2 comprises a connection end part 23 which is connected to the engaging element 1, and an annular elastic element 24 and a press ring 25 which abuts against the annular elastic element 24 are disposed on the connection end part 23. A shoulder is disposed on an end of the connection end part 23, and the annular elastic element 24 is sleeved on the connection end part 23. Then, the press ring 25 is sleeved on the connection end part 23 and abuts against the annular elastic element 24. At last, the connection end part 23 is connected to a lower end of the engaging element 1 via a thread. A lower end surface of the engaging element 1 and a shoulder surface of the connection end part 23 together fix the press ring 25 and the annular elastic element 24. A plurality of annular elastic elements 24 can be sleeved on the connection end part 23, and one press ring 25 is disposed between two adjacent annular elastic elements 24. The annular elastic element 24 and the press ring 25 can form a pushing assistance structure. It is acceptable that only one annular elastic element 24 is disposed between the lower end surface of the engaging element 1 and the shoulder surface of the connection end part 23. The annular elastic element 24 can fill a gap between an external circumferential surface of the connection end part 23 of the sliding sleeve opening tool and an inner wall of a sliding sleeve, so that a fluid flow at this position is reduced, which is beneficial for pushing the sliding sleeve opening tool to axially move along the wellbore by the external pumping pressure.

Figure 4C:
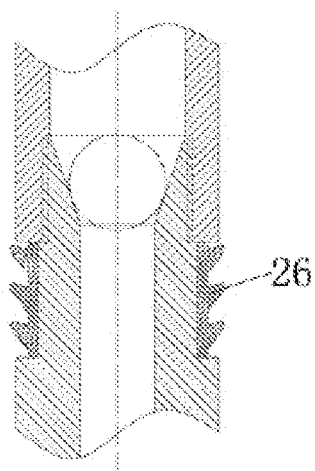
FIG. 4c schematically shows a structure of a ball seat having a mud scraping function.

FIG. 4c schematically shows a structure of a ball seat having a mud scraping function. Preferably, a cleaning element 26 is disposed at a lower end of the connection end part 23, so that a pipe wall of a sliding sleeve in a wellbore can be cleaned. A position of the cleaning element 26 is same as a position of the annular elastic element 24 and the press ring 25 in FIG. 4b, and the details thereof will not be repeated here.

Figure 5A:
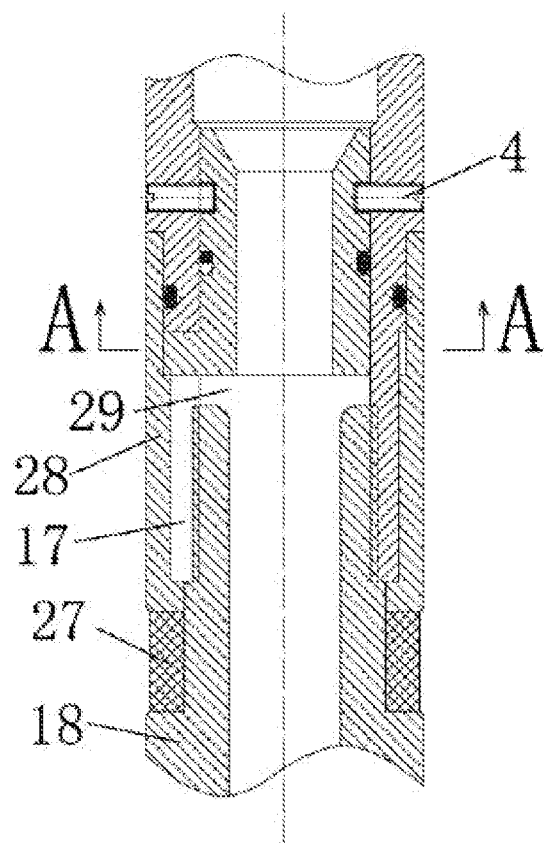
FIG. 5a schematically shows a structure of a ball seat having a sealing function.
Figure 5B:
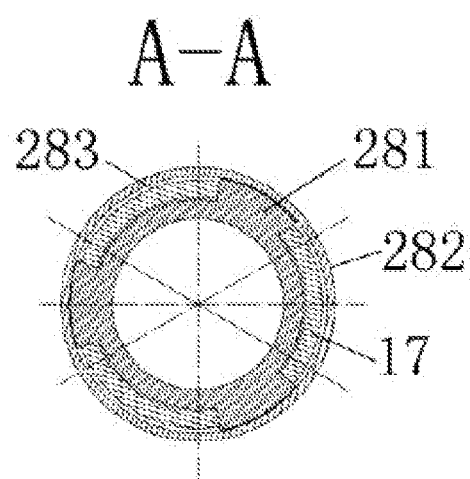

FIG. 5a schematically shows a structure of a ball seat having a sealing function, and FIG. 5b schematically shows an A-A cross-section view of FIG. 5a. Preferably, the engaging element 1 is engaged with a sliding sleeve in a wellbore, and a rubber barrel 27, which can be attached to the sliding sleeve in the wellbore after expanding due to extrusion, is disposed. An extrusion element 28 is disposed on an outer wall of the ball seat 2, and the extrusion element 28 is movably disposed on the engaging element 1 for extruding the rubber barrel 27. The rubber barrel 27 can expand after being extruded so as to be attached to the sliding sleeve in the wellbore. In this way, sealing between the sliding sleeve opening tool and the sliding sleeve in the wellbore can be achieved, and further a possibility that an operating fluid leaks into a well stage lower than the sliding sleeve opening tool is reduced.

Specifically as shown in FIG. 5b, the extrusion element 28 comprises a ring sleeve 281 which is movably sleeved on an inner side of the engaging element 1 and an extrusion sleeve 282 which is sleeved on an outer side of the engaging element 1. The engaging element 1 comprises a tube, a lower end (an end opposite to the well head) of which is provided with a plurality of lower pawl parts 17 that are disposed circumferentially with a distance therebetween and a connector 18 connected to a free end of a lower pawl part 17. The ring sleeve 281 extends through the plurality of lower pawl parts 17 and is connected to the extrusion sleeve 282. The rubber barrel 27 is sleeved on the connector 18 and abuts against a lower end of the extrusion sleeve 282. That is, the rubber barrel 27 is disposed between a protuberance of the connector 18 and the extrusion sleeve 282. Besides, the extrusion element 28 can be formed in one piece. In addition, the ring sleeve 281 can be connected to the engaging element 1 via the shear pin 4, so that the ring sleeve 281 can be fixed on the engaging element 1.

Preferably, a guiding groove 283 for accommodating the engaging element is disposed between an outer wall of the ring sleeve and an inner wall of the extrusion sleeve. The extrusion element 28 can be guided via the engaging element 1, and affections on movements of the extrusion element 28 due to relatively large elasticity of the lower pawl parts 17 can be reduced. Preferably, a space 29 is formed by a lower end surface of the ring sleeve 281, an inner side of the lower pawl parts 17 of the engaging element 1 and an end surface of the connector 18 with a thread, and the space 29 provides a buffer space for compression of the rubber barrel 27. A position of the lower end surface of the ring sleeve 281 is limited by the end surface of the connector 18 with a thread, and further a position of the extrusion element 28 is limited. In this way, a larger damage to the rubber barrel 27 due to excessive movements of the extrusion element 28 can be avoided. In a specific using process, a shear force of a shear pin for fixing an inner sleeve on an outer housing of a sliding sleeve is set as larger than a shear force of the shear pin 4 for fixing the extrusion element 28 on the engaging element 1. When a circulation channel needs to be opened, pressure of a corresponding pipe section is held. When the pressure reaches a certain value, the shear pin 4 of the ring sleeve 281 breaks. Then, the ring sleeve 281 is pushed to move downwards, and thus the extrusion element 28 moves downwards, so that the rubber barrel 27 is extruded. After the rubber barrel 27 is extruded to a certain degree, the pressure is increased continuously. After the pressure is increased to a certain value, the shear pin for fixing the inner sleeve of the sliding sleeve in the wellbore will break, and the inner sleeve of the sliding sleeve in the wellbore will move downwards so as to open the circulation channel. After an above process is finished, reservoir stimulation operation and successive works can be performed. Alternatively, the shear force of the shear pin for fixing the inner sleeve of the sliding sleeve in the wellbore can also be set as smaller than the shear force of the shear pin 4 of the extrusion element 28.

Figure 6A:
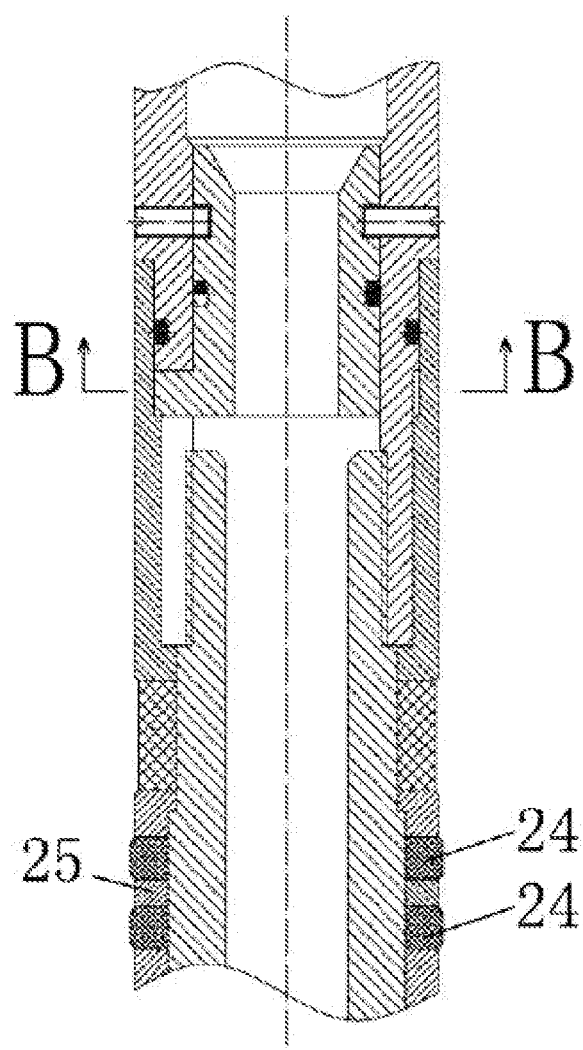
FIG. 6a schematically shows a structure of a ball seat having sealing and pushing assistance functions.
Figure 6B:
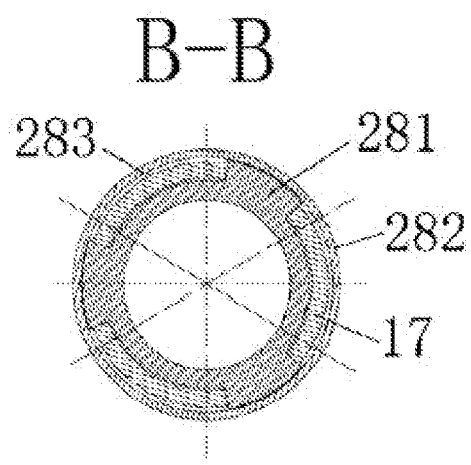

FIG. 6a schematically shows a structure of a ball seat having sealing and pushing assistance functions, and FIG. 6b schematically shows a B-B cross-section view of FIG. 6a. This embodiment is similar to the embodiment as shown in FIGS. 5a and 5b, and a difference only lies in that an annular elastic element 24 and a press ring 25 which abuts against the annular elastic element 24 are further disposed on the connection end part 23.

Figure 7A:
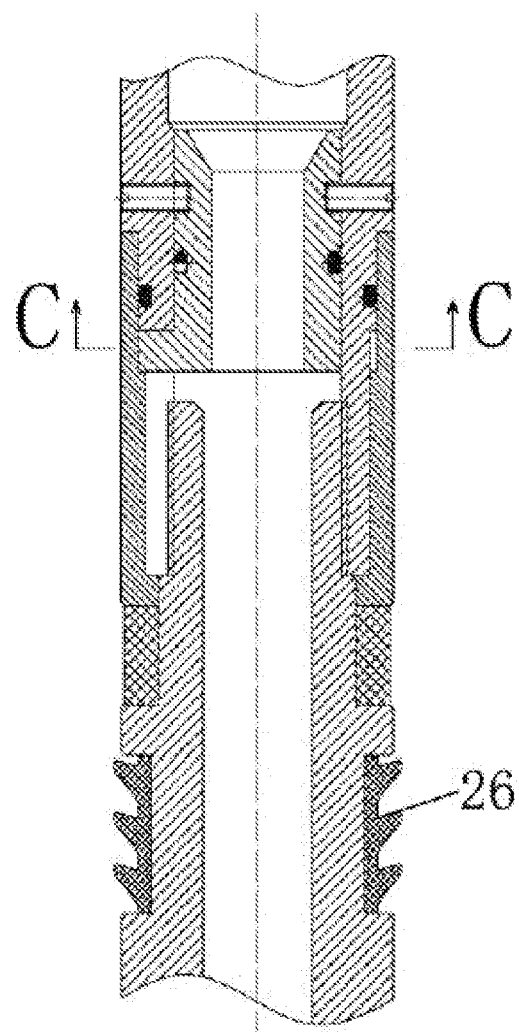
FIG. 7a schematically shows a structure of a ball seat having sealing, pushing assistance and mud scraping functions.
Figure 7B:
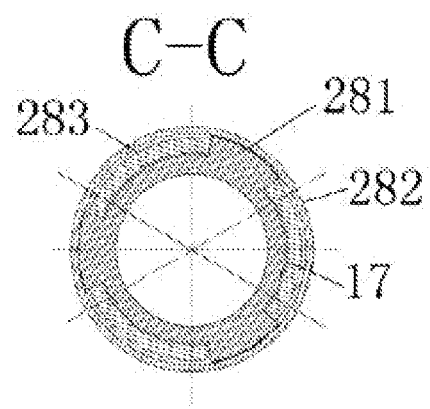

FIG. 7a schematically shows a structure of a ball seat having sealing, pushing assistance and mud scraping functions, and FIG. 7b schematically shows a C-C cross-section view of FIG. 7a. This embodiment is similar to the embodiment as shown in FIGS. 5a and 5b, and a difference only lies in that a cleaning element 26 is further disposed on the connection end part 23 so as to perform a cleaning to a pipe wall of a sliding sleeve in the wellbore.

To sum up, the present disclosure mainly has the following beneficial effects.

1. The sliding sleeve opening tool has a pushing function. A pushing tool can push a sliding sleeve opening tool in an uppermost stage close to the well head towards the well bottom. The sliding sleeve opening tool in the uppermost stage can engage with an engaging element of a sliding sleeve opening tool in an adjacent stage so as to push the sliding sleeve opening tool in the adjacent stage towards the well bottom. Same engagement is performed between two adjacent sliding sleeve opening tools, and finally all sliding sleeve opening tools in the wellbore can be pushed to the well bottom. In this way, full bore of the tubing string for fracturing can be achieved, and stimulation efficiency can be improved.

2. The sliding sleeve opening tool has a fishing function. When at least two sliding sleeve opening tools are put into the wellbore, two adjacent sliding sleeve opening tools can be connected to each other in sequence to form an entirety. In this way, all sliding sleeve opening tools can be connected in sequence and form an entirety. In this way, sliding sleeve opening tools which form an entirety by sequential connections can be fished out of the wellbore at one time, and efficiency of a fishing operation can be improved.

3. The sliding sleeve opening tool has a pushing assistance function. The annular elastic element and the press ring form a pushing assistance structure, and the annular elastic element can fill the gap between the external surface of the connection end part of the sliding sleeve opening tool and the inner wall of a sliding sleeve. In this way, the fluid flow at this position can be reduced, which is beneficial for pushing the sliding sleeve opening tool to axially move along the wellbore by the external pumping pressure.

4. The sliding sleeve opening tool has a mud scraping function. The pipe wall of the sliding sleeve in the wellbore can be cleaned by the cleaning element.

5. The sliding sleeve opening tool has a sealing function. After being extruded, the rubber barrel can be attached to the sliding sleeve in the wellbore. In this way, sealing between the sliding sleeve opening tool and the sliding sleeve in the wellbore can be achieved, and further a possibility that an operating fluid leaks into a well stage lower than the sliding sleeve opening tool is reduced. Moreover, the sliding sleeve opening tool has a simple structure. It is easy to produce and install the sliding sleeve opening tool, and cost thereof is low.

The present disclosure is illustrated in detail in combination with preferred embodiments hereinabove, but it can be understood that the embodiments disclosed herein can be improved, or components therein can be replaced by equivalents, without departing from the protection scope of the present disclosure. In particular, as long as there are no structural conflicts, the technical features disclosed in each and every embodiment of the present disclosure can be combined with one another in any way, and the combined features formed thereby are within the protection scope of the present disclosure. The present disclosure is not limited by the specific embodiments disclosed herein, but includes all technical solutions falling into the protection scope of the claims.

The invention claimed is:

1. A sliding sleeve opening tool, which comprises an engaging element, a ball seat and a guiding head connected in sequence,
    wherein the engaging element comprises at least two elastic pawls uniformly disposed in a circumferential direction and at least one engaging part disposed on an external circumferential surface of the elastic pawls, and the engaging element is further provided with a first fluid channel which runs through the engaging element, a guiding inclined surface is disposed on an external circumferential surface of an end of the engaging element far from the ball seat;
    wherein the ball seat is provided with a second fluid channel which runs through the ball seat, and within the second fluid channel a bearing surface for bearing a sealing ball is disposed, the second fluid channel being in communication with the first fluid channel; and
    wherein the guiding head is provided with a third fluid channel which runs through the guiding head, and the third fluid channel is in communication with the second fluid channel;
    wherein the engaging element is provided with a rubber barrel and an extrusion element is disposed on an outer wall of the ball seat, wherein the extrusion element can be movably disposed on the engaging element and is used for extruding the rubber barrel;
    wherein the extrusion element comprises a ring sleeve which is movably disposed on an inner side of the engaging element and an extrusion sleeve which is sleeved on an outer side of the engaging element, wherein the ring sleeve extends through a plurality of lower pawl parts and is connected to the extrusion sleeve, and wherein the rubber barrel is sleeved on a connector which is connected to a free end of the plurality of lower pawl parts of the engaging element and abuts against a lower end of the extrusion sleeve.

2. The sliding sleeve opening tool according to claim 1, wherein a protrusion or a groove is disposed on the external circumferential surface of the elastic pawl.

3. The sliding sleeve opening tool according to claim 1, a guiding inclined surface is disposed on an external circumferential surface of an end of the guiding head far from the ball seat.

4. The sliding sleeve opening tool according to claim 1, wherein the third fluid channel comprises a taper hole section disposed at an end of the guiding end, and a large-opening end of the taper hole section is far from the ball seat.

5. The sliding sleeve opening tool according to claim 4, wherein an inner diameter of the large-opening end of the taper hole section is smaller than an outer diameter of the guiding head, and an end surface is formed between an external circumferential surface of the guiding head and a hole wall of the taper hole section, wherein a longitudinal section of the end surface along an axial direction of the taper hole section is in a circular arc shape.

6. The sliding sleeve opening tool according to claim 4, wherein an annular groove which extends circumferentially along the third fluid channel is disposed on an inner wall of the third fluid channel.

7. The sliding sleeve opening tool according to claim 4, wherein a retaining part is disposed on an inner wall of the first fluid channel close to the ball seat, wherein the retaining part and the bearing surface together with the second fluid channel form a ball cage, and the sealing ball is disposed in the ball cage.

8. The sliding sleeve opening tool according to claim 1, wherein the ball seat has a connection end part which is connected to the engaging element, and an annular elastic element is disposed on the connection end part.

9. The sliding sleeve opening tool according to claim 8, further comprising a press ring which abuts against the annular elastic element.

10. The sliding sleeve opening tool according to claim 8, wherein a cleaning element is disposed on a lower end of the connection end part.

11. The sliding sleeve opening tool according to claim 1, wherein the engaging element comprises a tube body, a lower end of which is provided with the plurality of lower pawl parts disposed circumferentially with a distance therebetween, wherein the ring sleeve extends through the plurality of lower pawl parts and is connected to the extrusion sleeve, and the rubber barrel is disposed between the connector and the extrusion sleeve.

12. The sliding sleeve opening tool according to claim 1, wherein the ring sleeve is connected to the engaging element via a shear pin.

13. The sliding sleeve opening tool according to claim 1, wherein a guiding groove for accommodating the engaging element is disposed between an outer wall of the ring sleeve and an inner wall of the extrusion sleeve.

14. The sliding sleeve opening tool according to claim 1, wherein a space is formed by a lower end surface of the ring sleeve, an inner side of the plurality of lower pawl parts of the engaging element, and an end surface of an end of the connector having a thread.

\* \* \* \* \*